May 19, 1970     F. R. WRIGHT     3,512,303
THRESHOLD SEALING APPARATUS FOR DOORS
Filed March 14, 1967
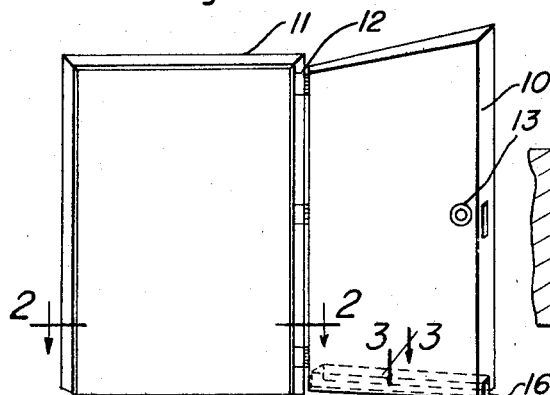
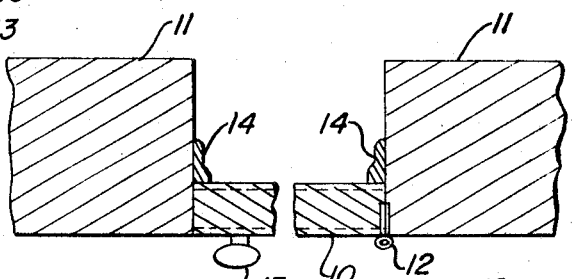
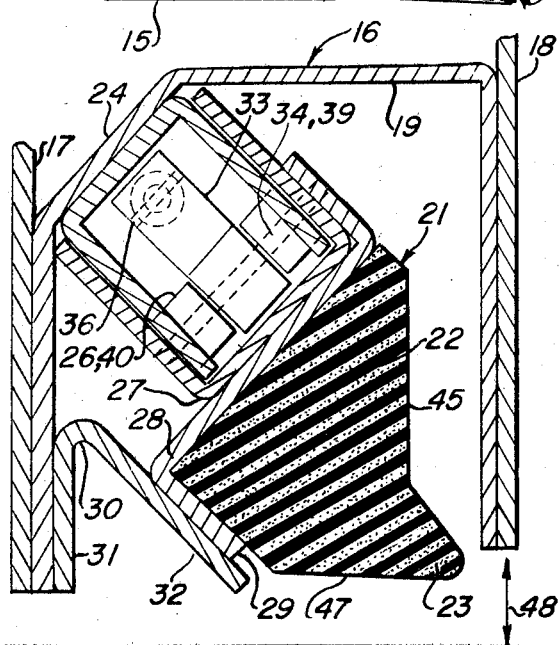
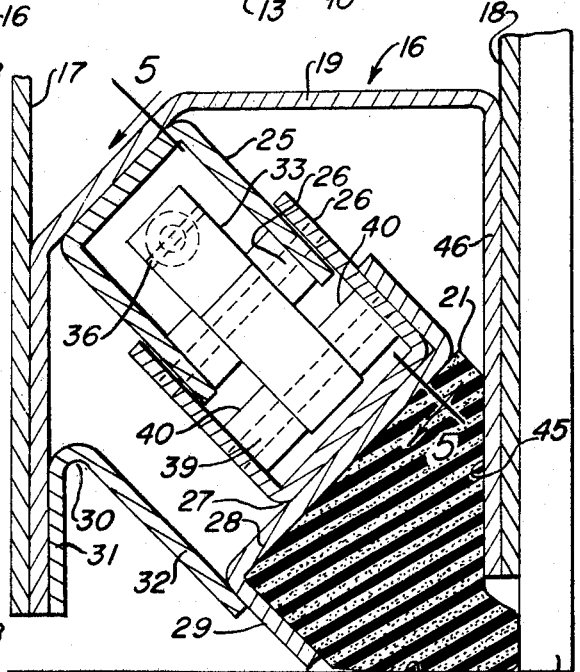
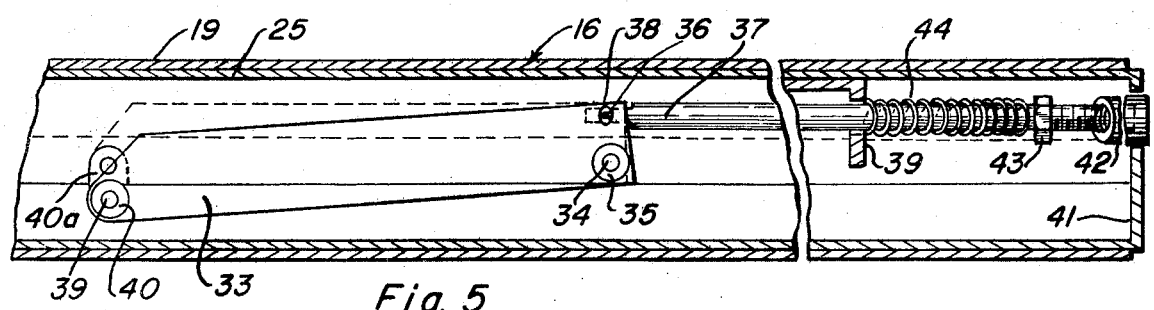
INVENTOR.
FRANCIS R. WRIGHT
BY PENDLETON, NEUMAN
SEIBOLD & WILLIAMS
ATTORNEYS United States Patent Office 3,512,303
Patented May 19, 1970

3,512,303
THRESHOLD SEALING APPARATUS FOR DOORS
Francis R. Wright, Glenwood, Ill., assignor to Rysdon Products Company, Chicago, Ill., a corporation of Illinois
Filed Mar. 14, 1967, Ser. No. 622,994
Int. Cl. E06b 7/20
U.S. Cl. 49—309          9 Claims

ABSTRACT OF THE DISCLOSURE

A device for sealing the threshold space beneath a door particularly against the transmission of sound wherein the actuating force applied to the flexible sealing member acts at an acute angle to the plane of the door and the flexible sealing member includes a toe portion for projection into the threshold space, against the door frame and against the door stop when the door is closed.

BACKGROUND OF THE INVENTION

Field of the invention

The field of the invention relates to methods and apparatus for sealing the gap or space surrounding a door and particularly the space underneath, or the threshold of, the door. More specifically, the field of the invention relates to devices for sound proofing the threshold space of a door and it is an object of the invention to provide improved devices of this character.

Description of the prior art

Devices for sound and weather sealing the space at the threshold of a door are known to the prior art. These include vertically movable gaskets and arcuately movable gaskets, each being actuated by a linkage or lever mechanism upon door closing. The gaskets are brought into sealing relationship by appropriately energized springs.

Prior art with which the applicant is familiar are the U.S. Pats. No. 1,697,408 J. L. Thompson, No. 3,059,287 J. J. Baruch et al., and No. 3,281,990 K. H. Nilsson.

The basic problem to be solved in providing a sound proof door is making certain that all air paths from one side of the door to the other are closed or sealed off. Air paths, however small, permit sound of substantial decibel level to be transmitted.

Eliminating such air paths poses its principal obstacle at the lower corners of the door where the sealing gasket must not only bear against the floor or threshold but it must bear against the vertical portion of the door frame. Equally important as the basic problem is that of providing sealing devices which achieve no air paths during operation which are inexpensive to make, easy to install and efficient in operation. Solutions to these problems are provided by the subject invention.

It is an object of the invention to provide improved devices and components for sound proofing the threshold space underneath a door which eliminate air gaps through the door space not only for the full width of the door but at the lower corners thereof.

In carrying out the invention in one form there is provided a threshold closing device for sealing the opening between a door and the floor beneath which comprises a channel member to be attached to the lower edge of such door extending across the width of the door and substantially in the plane thereof; a first guide member attached to the interior of said channel member, extending thereacross, and directed at an angle to said plane toward the lower closing door edge of said channel member; a second guide member interfitting with said first guide member and movable relative theerto at said angle to said plane; a sealing member attached to said second guide member and movable therewith at said angle toward said opening and away therefrom, in accordance with closing and opening door movements, respectively; and operating mechanism for moving said second guide member and attached sealing member in response to said closing and opening movements.

In a preferred embodiment, the sealing member comprises a body portion attached to the second guide member and a toe portion projecting from the body portion to be received in the threshold opening and to abut against any appropriately provided door stops. The compressive force exerted on the sealing gasket may be applied, in the preferred embodiment, at an angle of about forty-five degrees to the plane of the door.

The subject invention solves the problem of the prior art in that applying a force on the sealing gasket toward the threshold opening at an angle to the plane of the door forces the sealing gasket into the threshold opening door and thereby effectively seals it. The compressive force on the sealing gasket also causes the gasket to expand against the door frame at the sides of the door adjacent the bottom thereby to further seal air pathways. The sealing gasket includes a projecting toe portion which is forced into the threshold space and against vertical door stops to assure sealing of any air pathways in this area.

SUMMARY

The invention embodies in the combination of a door installation having a door frame rising from a floor and including jambs, a door hinged to one of said jambs, and door stops on said jambs for engagement by said door, there being clearance between the bottom of said door and said floor, sound sealing means for said clearance when said door is closed against said stops, comprising: walls forming a cavity with a downward opening in the lower edge portion of said door, said cavity and opening extending horizontally for the width of the door; a sound seal unit within and extending along the length of said cavity, and adapted for partial projection through said downward opening; means in said cavity guiding said sound seal unit for travel partially through said downward opening along an inclined plane that slants downwardly and towards the side of said door that faces said door stops, between an upper position, substantially retracted inside said cavity, and a lower position projecting from said cavity into sealing engagement with said floor and with said door stops, and means for moving said seal unit from said upper position to said lower position.

BRIEF DESCRIPTION OF THE DRAWINGS

FIG. 1 is a schematic perspective view of a frame and door to which the invention is applied;

FIG. 2 is a sectional view taken substantially in the direction of arrows 2—2 of FIG. 1 with the door in closed position and on a different scale;

FIG. 3 is an enlarged sectional view taken substantially in the direction of arrows 3—3 of FIG. 1 with the operating components in door-opened position;

FIG. 4 is a sectional view similar to FIG. 3 but with the operating components in door-closed position; and FIG. 5 is a sectional view taken substantially in the direction of arrows 5—5 of FIG. 4.

DESCRIPTION OF THE PREFERRED EMBODIMENT

Referring more particularly to the drawing, the invention is shown embodied in a door 10 attached to a door frame 11 by means of a series of hinges 12. The door 10 is operable by means of any well-known mechanism shown schematically, for example, as a door knob 13.

3

The door frame 11 extends around three sides of the door as in conventional installations and, along each vertical portion of the frame, there are door stops or molding strips 14 against which the door bears when it is in the closed position, as may be seen in FIG. 2. The door terminates short of the threshold or sill 15, thereby providing a gap underneath the door which is intended to be sealed in a soundproof manner by a device, according to the invention, shown schematically by the reference character 16.

The door proper 10 may be of any well-known construction to be soundproof in operation and, as shown in FIGS. 3 and 4, has metal planar sides indicated by the reference characters 17 and 18.

The sealing device or mechanism for soundproofing the door threshold, according to the invention, comprises a supporting channel member 19, a sealing or gasket member 21 and various guide and operating components to be described, the gasket member including a body portion 22 and a toe portion 23 projecting therefrom. In FIG. 3 the gasket member is shown in the retracted or door-open position.

The channel member 19 lies within the plane of the door with the open side of the channel extending downwardly and terminating essentially at the door's lower edge. One portion 24 of the channel base may be a flat surface at an angle thereto, for example, of forty-five degrees. Attached to the interior of surface 24, by welding or any suitable means, is an inverted channel 25 which runs substantially the full length of channel 19. Disposed over and easily slidable relative to the sides of channel 25 is a further channel member 26, the connection between channels 25 and 26 being the actuating mechanism of the door sealing device, as will be described.

Attached to the base 27 of channel 26, by welding or any other suitable means, is a further support and guide member 28 which includes a guide portion 29. The sealing gasket 21 is attached to guide member 28, including the guide surface 29 by any suitable bonding means (not shown). Also, extending the full length of channel member 16 is a supporting angular bracket 30, including a side 31 and an angularly directed slide member 32. The angle of slide member 32 is the same as the desired angular direction of movement of the gasket 22 which, in a preferred embodiment, may be forty-five degrees relative to the plane of the door. The vertical side member 31 is attached to one side of channel member 16, as shown, by any suitable means such a welding, for example.

The operating components of the door sealing device may be understood by considering FIGS. 3, 4 and 5. Pivotally supported inside of channel 25 is a link or lever 33, the pivot being provided at the right-hand end of link 33, as shown, by a pin 34 held in the channel sides, spacers 35 being provided, as shown, for maintaining link 33 appropriately centered. Upwardly from pin 34, as viewed in FIG. 5, is a second pin 36 which pivotally connects an actuating rod 37 and the link 33 together, pin 36 being disposed in an elongated slot 38 in link 33. At the other, or left hand end, as shown, of link 33 there is a pin 39 which connects channel 26 to link 33. Spacers 40 serve to maintain link 33 in a centered position between the sides of channel 26. Pivotal movemets of link 33, occasioned by movements of rod 37, cause up and down movements of channel 26 and the attached gasket 22. On upward movement, the spacers 40 move into recesses 40a.

The actuating rod is further supported by an opening in a bracket 39 and an opening in a closure member 41 appearing at one end of channel 25. The rod 37 may include an end member 42 threaded thereto and a threaded nut 43 against which bears one end of a helical spring 44. Spring 44 surrounds the rod 39 and, at its other end, bears against one flange of bracket 39. As may be visualized in FIG. 5, movements toward the left of member 42 and rod 39 cause pivoting of link or lever 33 to the downward or

4 solid line position, such movements occurring upon closing of the door.

Closing of the door causes compression of spring 44 and opening the door releases the member 42 and permits the spring 44 to expand against nut 43, thereby pivoting link 33 upwardly to the dotted line, or open door, position. The dotted line position of link 33, shown in FIG. 5, corresponds to the position of the operating members, including gasket 22, shown in FIG. 3, and the solid line position of link 33 in FIG. 5 corresponds to the position of the components shown in FIG. 4.

The interfitting of channel member 26 with channel member 25 may provide sufficient support for movement of the channel member 26 to effect sealing engagement of the gasket member 22. In addition, however, the angular surface 32 of supporting bracket 30 provides additional support and guiding influence for the flange member 29 when riding thereon.

The sealing member 22 is shaped, as shown, for cooperation with the various surfaces against which one or more surfaces of the gasket have to bear in performing the sealing and sound proofing operation. Thus, the gasket includes a vertical surface 45 for contacting the interior surface 46 of channel 16, and a bottom or horizontal surface 47 for engaging the floor or seal 15. The toe portion 23 projects into and through the threshold space 48 underneath the door and, as shown in FIG. 4, bears against the inner edge of the door stop member 14. In so doing, the toe 23 deforms to a blunter condition, as shown in this figure. Also, as may be visualized in FIG. 4, the vertical surface 45 of the gasket bears firmly against the surface 46 and the horizontal surface 47 of the gasket bears firmly against the floor or sill 15 thereby providing a complete soundproof seal at these two surfaces. The angular movement of the gasket 22, thus, brings two of its surfaces at right angles to each other into sealing engagement with other surfaces and brings the toe into engagement with the door stop.

In addition, the compression of the gasket 22 brought about by forcing it into contact with the surfaces indicated, causes the ends of the basket to bulge outwardly slightly and come into contact with the door frame members 11, as may be visualized in FIG. 2. Accordingly, all air spaces through the door space which may exist at the bottom edge of a door are completely eliminated and sealed off.

The gasket 22 may be made of any slightly deformable material such, for example, as neoprene rubber or the like. While the shape of the gasket shown, including the toe portion 23, is one form of gasket within the contemplation of the invention, other forms within the inventive scope may be devised by those skilled in the art.

The axis of movement of the channel member 26 and thus of the gasket 22 is shown, for example, in the figure to be about forty-five degrees. While this is a preferred form, other angularities may be utilized so long as the forces are directed to bring the gasket material into engagement with the facing side of the channel, the floor beneath the door, the door stop and the door frame. It fits into the threshold space beneath the door.

While a particular embodiment of the invention has been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

I claim:

1. In combination in a door installation comprising a door frame rising from a floor and including jambs, a door hinged to one of said jambs, and door stops on said jambs for engagement by said door, and there being a clearance between the bottom of said door and said floor, sound sealing means for said clearance when said door is closed against said stops, comprising:

walls forming a cavity with a downward opening in the lower edge portion of said door, said cavity and opening extending horizontally for the width of the door;

a sound seal unit within and extending along the length of said cavity, and adapted for partial projection through said downward opening;

means in said cavity guiding said sound seal unit for travel partially through said downward opening along an inclined plane that slants downwardly and towards the side of said door that faces said door stops, between an upper position, substantially retracted inside said cavity, and a lower position projecting from said cavity into sealing engagement with said floor and with said door stops, and means for moving said seal unit from said upper position to said lower position.

2. The invention according to claim 1 characterized in that said sound seal unit includes sealing surface portions adapted, when said sound seal unit projects through said downward opening, for engaging said floor, for effectively engaging lower edge portion of said door, and for engaging said door stops, and said guiding means in said cavity guides said sound seal unit in its lower position into effective sealing engagement with the lower edge portion of said door.

3. The invention according to claim 1 characterized in that the slant of said inclined plane is approximately forty-five degrees.

4. The invention according to claim 1 characterized in that said sound seal unit comprises a body portion and a projecting toe portion wherein said body portion engages the floor and said toe portion engages said door stop.

5. Closing devices for sealing the threshold opening between a door and the floor therebeneath comprising a first channel member to be attached to the lower edge of such door extending across the door width and substantially in the plane thereof; a first guide member attached to the interior of said first channel member, extending thereacross, and directed at an angle to said plane toward the lower closing door edge of said first channel member; a second guide member interfitting with said first guide member and movable relative thereto at said angle to said plane; an auxiliary support member attached to said second guide member; a sealing member attached to said auxiliary support member and movable with said second guide member at said angle toward said opening and away therefrom, in accordance with closing and opening door movements, respectively; said auxilairy support member includes a member disposed at the angle of said first guide member; and operating mechanism for moving said second guide member and attached sealing member in response to said closing and opening movements.

6. The invention according to claim 5 characterized in that a secondary support member is disposed interiorly of said first channel member at said angle to the door plane, and said auxiliary support member rides on said secondary support member during the movements of said sealing member.

7. The invention according to claim 6 characterized in that the sealing member comprises a body portion attached to said auxiliary support member and a toe portion projecting from said body portion to be received in the threshold opening.

8. The invention according to claim 5 characterized in that said first guide member comprises a second channel member whose base is attached to the first channel member and said second guide member comprises a third channel member interfitting with said second channel member and whose channel opening faces toward the base of said second channel member.

9. The invention according to claim 8 characterized in that the operating mechanism for the second guide member and attached sealing member is disposed interiorly of the innterfitting second and third channel members.

References Cited

UNITED STATES PATENTS

| 728,686 | 5/1903 | Douden et al. | 49—307 |
| 1,974,638 | 9/1934 | Axe | 49—489 |
| 2,032,698 | 3/1936 | Grady | 49—303 |
| 2,298,878 | 10/1942 | Egli | 49—308 |
| 2,552,369 | 5/1951 | Currie | 49—309 |
| 2,908,948 | 10/1959 | Jones | 49—303 |
| 3,331,158 | 7/1967 | Frakes | 49—310 |

DAVID J. WILLIAMOWSKY, Primary Examiner

P. C. KANNAN, Assistant Examiner

U.S. Cl. X.R.

49—488, 489